(12) United States Patent
Tebbe et al.

(10) Patent No.: US 10,058,194 B2
(45) Date of Patent: Aug. 28, 2018

(54) CAR SEAT COVER

(71) Applicant: Munchkin, Inc., Van Nuys, CA (US)

(72) Inventors: Mark Gerard Tebbe, Ventura, CA (US); Maryann Benshin Chi, Monterey Park, CA (US); Steven Bryan Dunn, Beverly Hills, CA (US); Mark Hatherill, Beverly Hills, CA (US)

(73) Assignee: Munchkin, Inc., Van Nuys, CA (US)

( * ) Notice: Subject to any disclaimer, the term of this patent is extended or adjusted under 35 U.S.C. 154(b) by 0 days.

(21) Appl. No.: 15/426,028

(22) Filed: Feb. 6, 2017

(65) Prior Publication Data

US 2017/0224128 A1 Aug. 10, 2017

Related U.S. Application Data

(60) Provisional application No. 62/291,767, filed on Feb. 5, 2016.

(51) Int. Cl.
*A47D 15/00* (2006.01)
*A47C 7/66* (2006.01)
*B60N 2/60* (2006.01)

(52) U.S. Cl.
CPC .............. *A47D 15/00* (2013.01); *A47C 7/66* (2013.01); *B60N 2/6009* (2013.01)

(58) Field of Classification Search
CPC ........ B60N 2/6009; A47C 7/66; A47D 15/00; A47D 13/025
See application file for complete search history.

(56) References Cited

U.S. PATENT DOCUMENTS

| | | | | |
|---|---|---|---|---|
| 4,946,221 A * | 8/1990 | Livingston | ............. | A47D 15/00 297/184.13 |
| 5,590,896 A * | 1/1997 | Eichhorn | ............. | B62B 7/08 188/20 |
| 5,730,490 A * | 3/1998 | Mortenson | ............. | A47D 13/02 297/184.11 |
| 6,012,184 A * | 1/2000 | Childers | ............. | A47D 15/00 5/416 |
| 6,019,421 A * | 2/2000 | Roh | ............. | A47C 29/006 297/184.13 |
| 6,036,261 A * | 3/2000 | Woods | ............. | B60N 2/28 297/184.13 |
| 6,056,355 A * | 5/2000 | Klassen | ............. | A47D 15/00 297/184.1 |
| 6,209,953 B1 * | 4/2001 | Mackay | ............. | B60N 2/28 297/184.1 |
| 6,517,153 B1 * | 2/2003 | Brewer | ............. | A47C 7/66 297/184.1 |
| D509,699 S * | 9/2005 | Reamer | ............. | D6/611 |
| 7,083,228 B1 * | 8/2006 | Al Sawan | ............. | B62B 9/142 297/184.13 |
| 7,284,790 B1 * | 10/2007 | Brewer | ............. | A47C 7/66 297/184.13 |
| 8,550,548 B2 * | 10/2013 | Gibbons | ............. | B62B 9/142 297/184.13 |

(Continued)

*Primary Examiner* — Timothy J Brindley
(74) *Attorney, Agent, or Firm* — Robert Z. Evora, Esq.; Christian Lek

(57) ABSTRACT

A protective cover is described which can be secured onto a car seat or other similar seating apparatus. The cover has multiple layers which are rollable to allow different levels of exposure of the infant to the external environment.

18 Claims, 4 Drawing Sheets

(56) References Cited

U.S. PATENT DOCUMENTS

| | | | | |
|---|---|---|---|---|
| 8,746,789 B2* | 6/2014 | Berry | A47D 13/02 | 297/184.13 |
| 2004/0026965 A1* | 2/2004 | Haney | B60N 2/28 | 297/184.13 |
| 2005/0275257 A1* | 12/2005 | McGregor | B60N 2/2842 | 297/219.12 |
| 2006/0284456 A1* | 12/2006 | Compton | B60N 2/286 | 297/184.13 |
| 2007/0262103 A1* | 11/2007 | Blakley | A45B 11/02 | 224/190 |
| 2010/0072793 A1* | 3/2010 | Kress | A47C 7/66 | 297/184.13 |
| 2012/0062001 A1* | 3/2012 | Krasley | B62B 9/142 | 297/184.13 |
| 2013/0057032 A1* | 3/2013 | Turnage | A47D 15/00 | 297/184.13 |
| 2014/0021751 A1* | 1/2014 | Lang | A47D 15/00 | 297/184.13 |
| 2014/0183843 A1* | 7/2014 | Iftinca | B62B 7/06 | 280/647 |
| 2015/0183352 A1* | 7/2015 | Bowe | A47D 15/00 | 297/184.11 |
| 2017/0129525 A1* | 5/2017 | Ostad | B62B 9/147 | |
| 2018/0035814 A1* | 2/2018 | Peleg | A47D 13/025 | |

* cited by examiner

CAR SEAT COVER

CROSS REFERENCE TO RELATED APPLICATIONS

This application claims priority to U.S. Provisional Patent Application Ser. No. 62/291,767, filed Feb. 5, 2016; the content of which is hereby incorporated by reference herein in its entirety into this disclosure.

TECHNICAL FIELD

The subject disclosure relates generally to the field of protective covers. In particular, the subject disclosure relates to covers for a car seat.

BACKGROUND

Infants and toddlers are often transported in a portable car seat or other carrying apparatus. During such transport, the infant is exposed to various environmental conditions, such as, for example, snow, rain, cold temperatures, sun, high heat, insects or other animals. All of these environmental conditions would be detrimental to the health of a fragile body. Parents and caretakers try to dampen some of the effects of these environmental hazards by covering the infant up with multiple layers to serve as a barrier between the infant and the environment. However, the additional layers could add their own hazards such as affecting the breathing of the infant, or getting caught up in other objects during transport. Thus, transporting an infant in a car seat while protecting the infant from environmental hazards is an ongoing concern for parents and caretakers.

SUMMARY OF THE SUBJECT DISCLOSURE

The present subject disclosure provides a concept for novel devices which may be used as protective covers for infants while they are in standard car seats, chairs, or other infant cradling, seating, or holding apparatus. The present subject disclosure provides multiple layers of covering which serve different functions to allow the parent or caretaker to choose which one or more covering layer is desired for a given environment at a given time. The subject matter is easy to use or adjust, add or remove, clean and operate.

In one exemplary embodiment, the present subject matter is a protective cover. The seat cover includes a frame having an elastic edge, the elastic edge adapted to fit over a car seat; a first layer of material within the frame; and a second layer of material within the frame and substantially overlapping the first layer of material; wherein the first layer of material is rollable over the second layer of material.

In another exemplary embodiment, the present subject matter is a protective cover for a car seat. The container assembly includes a frame having an elastic edge, the elastic edge adapted to stretch over a car seat; a first layer of insulating material within the frame; a second layer of mesh material within the frame and larger in size than the first layer of material, wherein when the first layer of material is fully extended to cover the second layer of material, an exposed portion of the second layer of material remains uncovered; a storage compartment; and wherein the first layer of material is rollable into the storage compartment.

In yet another exemplary embodiment, the present subject matter is a protective cover for a car seat. The seat cover includes a frame having an elastic edge, the elastic edge adapted to stretch over a car seat; a first layer of insulating material within the frame; a second layer of mesh material within the frame and larger in size than the first layer of material, wherein when the first layer of material is fully extended to cover the second layer of material, an exposed portion of the second layer of material remains uncovered; and an extendable canopy positioned on the frame that covers the exposed portion of the second layer of material.

BRIEF DESCRIPTION OF THE DRAWINGS

Various exemplary embodiments of this disclosure will be described in detail, wherein like reference numerals refer to identical or similar components or steps, with reference to the following figures, wherein.

DETAILED DESCRIPTION

Figure 1A:
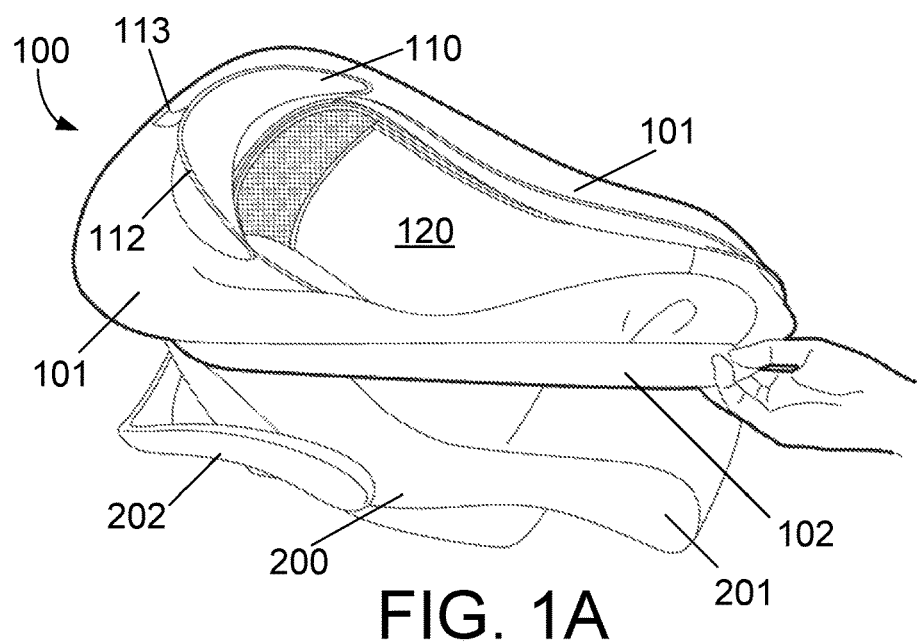
FIG. 1A illustrates a perspective view of the placement and removal of a seat cover, according to an exemplary embodiment of the present subject disclosure.
Figure 1B:
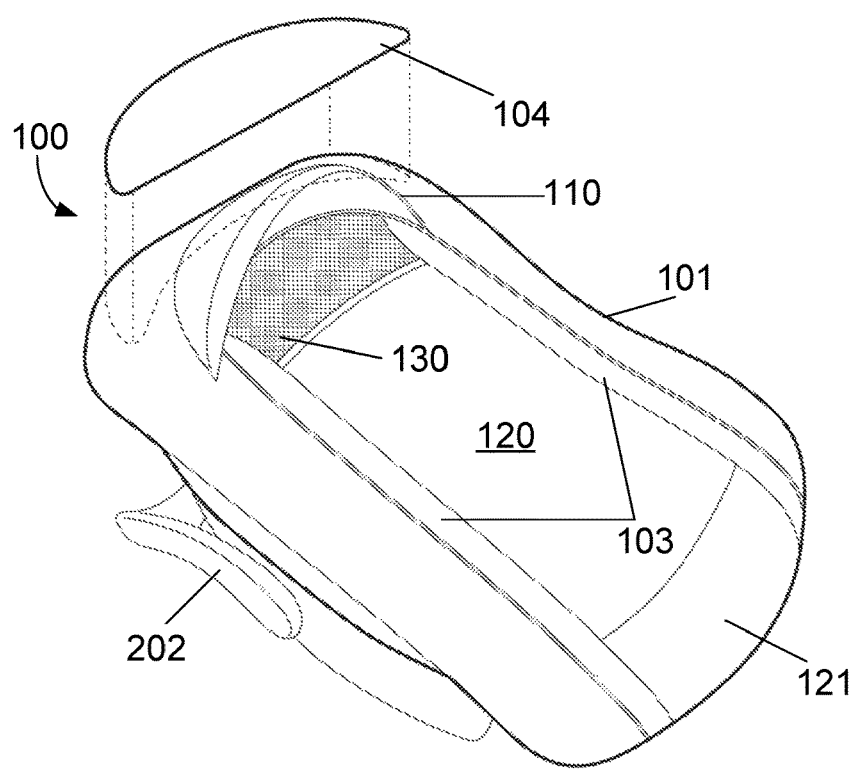
FIG. 1B illustrates a perspective view of a seat cover, according to an exemplary embodiment of the present subject disclosure.

Particular embodiments of the present subject disclosure will now be described in greater detail with reference to the figures.

An exemplary embodiment of the present subject disclosure is presented as a cover 100, as shown in FIGS. 1A-1B and 2A-2B. The seat cover 100 is designed to fit over a standard car seat 200, cradle, crib, or other similar apparatus. The examples presented herein and throughout this disclosure are with respect to a standard car seat 200 having a seat portion 201 and a handle 202. However, the present cover 100 is not limited to car seats 200, and may be applicable and configured with chairs, strollers, cribs, or other similar products.

The cover 100 includes an upper surface frame 101 having an upside down U-shaped configuration with two side portions linked by a top portion. A further elastic layer 102 is positioned on an exterior edge of the upper surface frame 101 and serves to wrap around corresponding structures of the car seat 200 and firmly maintain the car cover 100 thereon. The upper surface frame 101 may include rigid inserts 104 placed at strategic positions to maintain the structural integrity of that portion of the upper surface frame 101. For example, rigid insert 104 may be inserted within the body of the upper surface frame 101 at a position just above a retracting canopy 110 and may serve to maintain the structural integrity of the frame 101 material which is positioned above the face of the infant to prevent the collapse of the cloth and material upon the infant's face. The rigid insert 104 works in conjunction with the rigid canopy 110 to keep the upper portion of the cover 100 relatively rigid to prevent the material from collapsing onto the face of the infant. Other locations for the rigid inserts are possible, and can be positioned at, for example, the feet portion or side portions of the infant with respect to the cover 100. The rigid insert 104 may be a hardened plastic, cardboard, or other material having properties which bring some level of stiffness to the area in proximity to it.

A removable external layer 120 of covering is positioned on the middle portion of the upper surface of the cover 100, surrounded substantially by the U-shaped upper surface frame 101. Underneath the external layer 120 is a removable interior layer 130. The external layer 120 may be shorter in length than the internal layer 130 allowing a breathing area for the infant when both internal 130 and external layers 120 are fully unrolled, as will be described with respect to FIGS. 4A-4C. Alternatively, the external layer 120 may be sufficiently long to cover the entire interior layer 130, and may have an air vent or other similar apparatus for allowing ventilation and breathing of the infant when the external layer 120 is completely covering the interior layer 130.

Figure 2A:
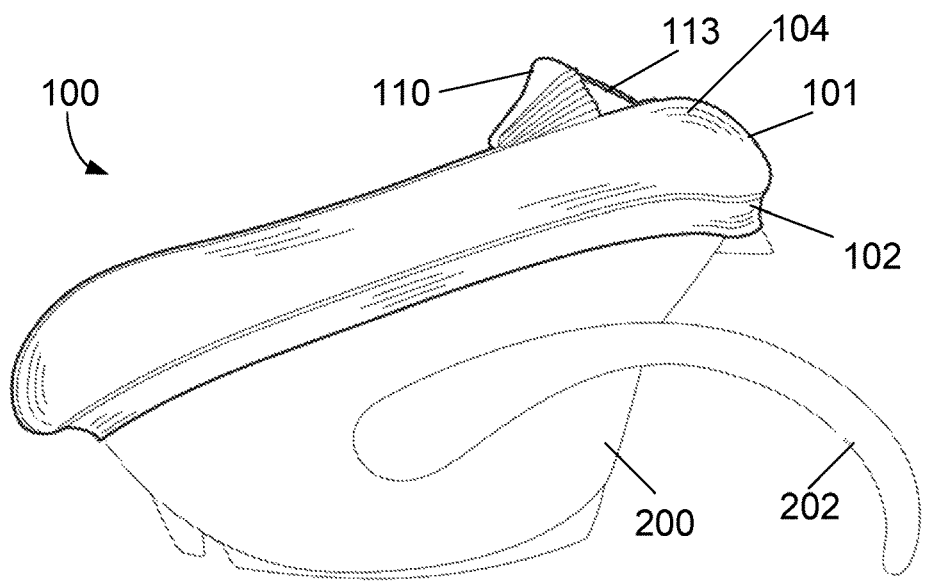
FIG. 2A illustrates a side view of a seat cover with the canopy pulled back, according to an exemplary embodiment of the present subject disclosure.
Figure 2B:
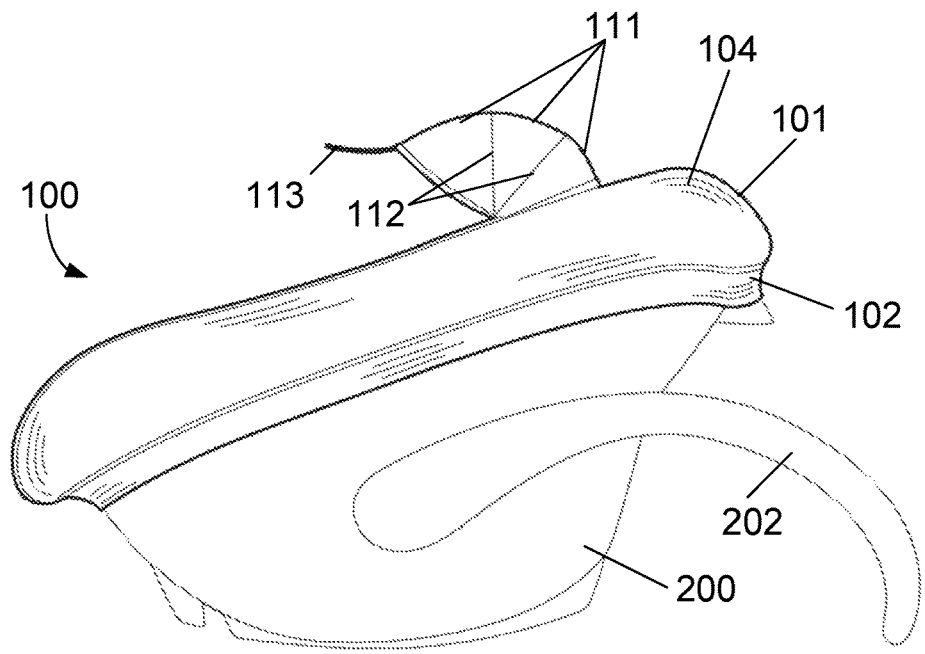
FIG. 2B illustrates a side view of a seat cover with the canopy pulled forward, according to an exemplary embodiment of the present subject disclosure.

As illustrated in FIGS. 2A-2B, the canopy 110 is retractable, and includes a strap 113, which serves to maintain or secure the position of the canopy 110 as needed. The canopy 110 itself may be layered by overlapping segments 111, separated by rigid inserts 112, which serve to create multiple overlapping layers when opened up, as shown in FIG. 2A. Rigid inserts 112 function similarly to the metallic rod inserts in an umbrella, and serve to prop up the canopy 110 in a direction away from the face of the infant. When the canopy 110 is closed, the rigid inserts 112 align with each other as shown in FIG. 2A. This accordion-like configuration for the canopy 110 allows for easy opening (FIG. 2A) and closing (FIG. 2B) of the canopy 110 as needed to cover the face of the infant if conditions warrant it. The rigid insert 104 positioned just higher than the canopy 110 also serves to maintain the fabric of the cover 100 away from the face of the infant when the infant is placed in the car seat 200. The canopy 110 and rigid insert 104 both serve to maintain the structural integrity of the cover 100 in the area above the infant's face. They both essentially push the cover 100 in the opposite direction of the infant's face.

Also shown more clearly in FIGS. 2A-2B is the elastic nature of the outer band 102 which extends beyond the wider portions of the car seat 200 and secures the cover 100 to it by friction fit. The elastic band 102 may be threaded with elastic rubber so that it grips to the side of the seat portion 201 of the car seat 200 and creates a better seal with inclement weather, such as cold. Other attachment devices may also be used in place of or in addition to the elastic band 102 including, but not limited to, snaps, buttons, VELCRO, or the like. A further hinge clasp (not shown) or other similar device positioned on the elastic band 102 may be used to grip around the hinges of the handles of a car seat 200 to seal in warmth. Flexible teeth on the inside of the hinge clasp would allow it to grip over different size hinges.

Figure 3A:
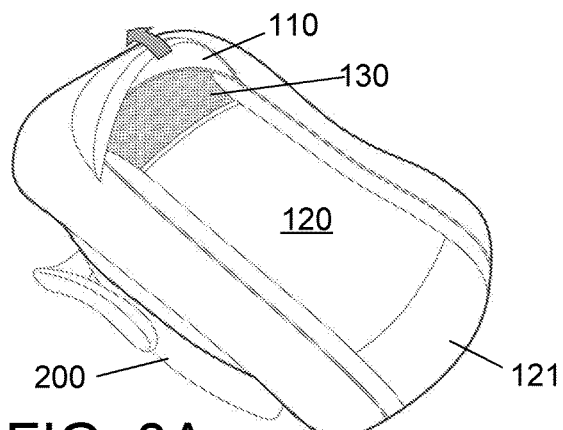
FIG. 3A illustrates a side view of a seat cover with the canopy in a middle position, according to an exemplary embodiment of the present subject disclosure.
Figure 3B:
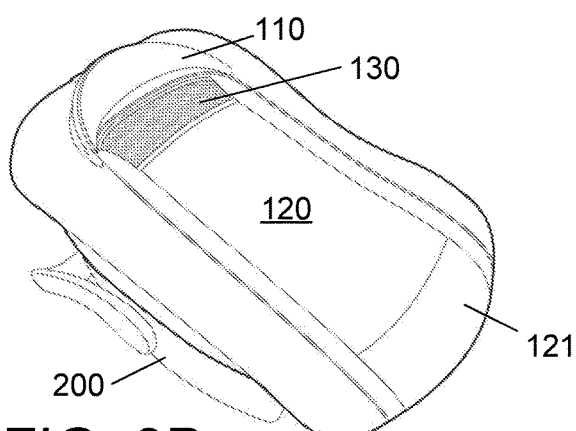
FIG. 3B illustrates a side view of a seat cover with the canopy pulled back, according to an exemplary embodiment of the present subject disclosure.
Figure 3C:
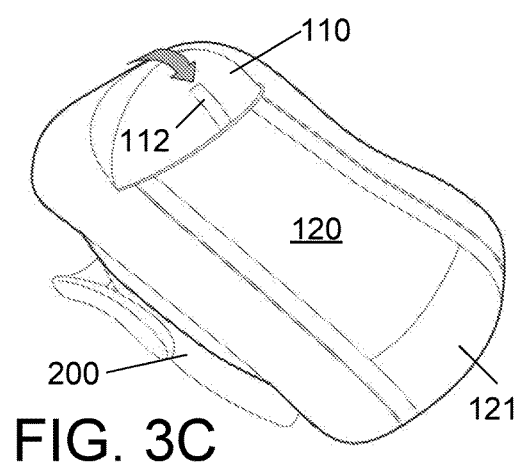
FIG. 3C illustrates a side view of a seat cover with the canopy pulled forward, according to an exemplary embodiment of the present subject disclosure.

FIGS. 3A-3C illustrate the versatile nature of the canopy 110 as used in different conditions. As shown in FIG. 3A, the canopy 110 may be partially opened to allow some protection of the infant's face from the external environment, such as the sun. In this example, the canopy 110 acts as a visor to block out some partial view of the infant's face without fully covering the infant's face. The canopy 110 may be moved back up, as shown by the arrow in FIG. 3A to completely open the canopy, as shown in FIG. 3B. In this case, the canopy 110 is substantially layered, as shown in FIG. 2A, and may be used to allow full visibility of the infant's face to the external environment. Strap 113 may be used to secure the layered canopy 110 on to the frame 101 to prevent the unrolling of the canopy 110 onto the infant's face area. This may be most desirable at night or in pleasant weather or when there is no potential for direct harm to the infant's face from having no canopy coverage thereon.

In the scenario shown in FIG. 3C, the canopy 110 is completely shut so that the infant's face is completely covered. This scenario may be most desirable when there is sun, rain, snow, sleet, or other conditions which would warrant as much protection of the infant's face as possible. Also, the covering of the face area of the infant, as shown in FIG. 3A, would be desired when additional protection is needed to prevent insects from having access to the infant, or when other curious or potentially dangerous animals are nearby. In the scenario shown in FIG. 3C, the strap 113 may be used to secure the canopy 110 to the external layer 120 to prevent the unintended opening of the canopy 110.

Figure 4A:
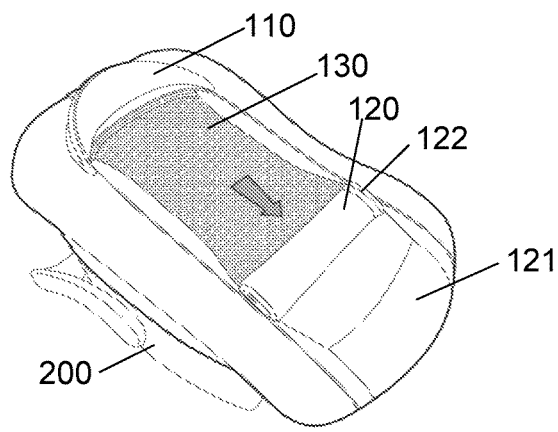
FIG. 4A illustrates a side view of a seat cover with an outer layer being removed, according to an exemplary embodiment of the present subject disclosure.
Figure 4B:
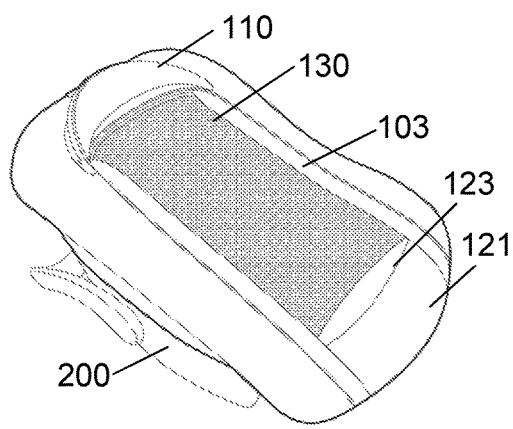
FIG. 4B illustrates a side view of a seat cover with an outer layer removed, according to an exemplary embodiment of the present subject disclosure.
Figure 4C:
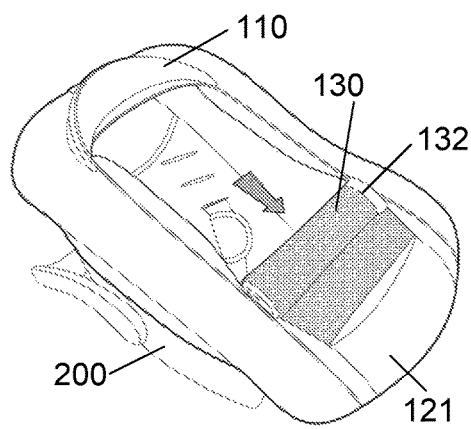
FIG. 4C illustrates a side view of a seat cover with an inner layer being removed, according to an exemplary embodiment of the present subject disclosure.

As illustrated in FIGS. 4A-4C, cover 100 includes multiple layers which add flexibility and functionality to the use of the cover. Depending on the environmental conditions, a parent or caretaker can use various layers of the cover 100 to best protect the infant. As shown in FIG. 4A, the external layer 120 may be rolled down to expose the inner layer 130 to the external environment. The canopy 110 is preferably in an open position, as shown in FIG. 4A, to allow easier access to the layers 120 and 130, although the canopy 110 does not have to be fully open to do so. External layer 120 has an edge 122 which is secured to an internal edge of the frame 101 using any standard securing device, such as a zipper, VELCRO, buttons, or other attaching technique known to one having ordinary skill in the art. The external layer 120 may be rolled as shown in FIG. 4A toward a rolled layer storage compartment 121, such as a pocket, of the cover 100. Pocket opening 123 allows for the rolled external layer 120 to fit within the pocket 121 and be secured therein. The pocket opening 123 may further include a zipper or other closing mechanism to close the pocket 121 when the external layer 120 is not secured therein. In another exemplary embodiment, the rolled external layer 120 may be detachable from the cover 100. An extended piece of fabric or flap 103 is positioned atop the zippers 122 and 132 to cover them. This flap 103 helps to prevent water from seeping into the interior of the cover 100 through the zippers 122, 132.

As the external layer 120 is rolled and tucked into pocket 121 (or removed completely), the internal layer 130 becomes exposed to the outside environment, as illustrated in FIG. 4B. This configuration may be ideal in environments where the warmer outer layer 120 is not needed but the inner layer 130 is helpful to prevent insects or other animals to have access to the infant. For example, the configuration of FIG. 4B may be ideal in a picnic or beach or other environment where it is ideal to have the infant access to wind and breeze without having to expose the infant to potential insects and other animals which could harm the infant. The external layer 120 may be completely removable (not shown) or be secured to the cover 100 at pocket opening 123 or within pocket 121, as shown in FIG. 4B.

As illustrated in FIG. 4C, the internal layer 130 is likewise rollable and tuckable into pocket 121 in a similar fashion as to the rollability and tuckability of external layer 120 within pocket 121. Alternatively, both layers 120 and 130 may be completely detachable from the cover 100. Internal layer 130 has an edge 132 which is secured to an internal edge of the frame 101 using any standard securing device, such as a zipper, VELCRO, buttons, or other attaching technique known to one having ordinary skill in the art.

Cover 100 may be used in variety of ways. In one method, the infant is first placed into a car seat 200 and secured therein. The cover 100 is then secured onto the car seat 200, while the infant is resting therein. The external layer 120 and internal layer 130, and canopy 110 are then adjusted accordingly for a desired level of protection from environmental elements.

Alternatively, the cover 100 may be already secured atop the car seat 200 whenever the infant is placed or removed from the car seat 200. In this scenario, the outer external layer 120 and inner layer 130 are zippered open and unrolled as needed to gain full access to the seat portion 201 of the car seat 200. The outer layer 120 and inner layer 130 are purposely made large to provide a large access area to the infant placed underneath them. This also make it possible to not remove the cover 100 from the car seat 200 and only remove the layers 120, 130 as needed to place and remove the infant in/from the car seat 200.

The cover 100 may be used to protect the infant when placed in any car seat, shopping cart, high chair, stroller, or other seating or resting apparatus which can accommodate the elastic outer edges 102 of the cover 100. Such seating apparatus may be outside the home, or inside the home. The versatile nature of the cover 100, as well as its low profile and light weight and durability makes it ideal to be a part of the routine travel apparatus for a parent wherever the toddler is taken.

The exemplary embodiments presented herein are shown having two layers, namely exterior layer 120 and interior layer 130, for sake of simplicity. However, any number of layers may be used as long as each layer is removable and/or unrollable as discussed herein. In the exemplary embodiments shown, outer layer 120 may be thermally insulated to keep the infant warm as needed and prevent excess body heat loss. Further, the outer portion of the external layer 130 may be water repellant and waterproof to prevent the soaking of the underneath cloth or materials which comprise the car seat, or the clothes or blanket of the infant held therein. This is particularly useful when transporting the infant when it is raining, sleeting, or snowing outside.

The inner layer 130 may be a breathable mesh to allow easy viewing of the infant. The external 120 and inner layer 130 may be zipped or opened as needed to any extent to allow more breathability (layer 120 rolled or removed) or more warmth or protection from rain/snow/etc. (layer 120 unrolled or zipped up). When the external layer 120 is unzipped ore removed, the interior layer 130 can double as a mosquito netting that allows year-round coverage in one product. Thus, the cover 100 may be used all year round, and adjusted as needed depending on the weather condition.

The cover 100 may be constructed of any combination of fabric and/or soft and/or hard plastic which are hypoallergenic, machine washable, and durable to withstand daily use. In one exemplary embodiment, the external lawyer 120 has multiple layers, and the fabric and batting on the outside may be composed of performance driven materials, similar to materials used for high performance clothing, such as hiking jackets. These types of materials keep the infant warm as needed, and are water/weather resistant. The inner fabrics are softer, applicable materials for infant contact. This ensures that any infant contact with the inner fabric does not result in skin abrasions or discomfort for the infant.

The illustrations and examples provided herein are for explanatory purposes and are not intended to limit the scope of the appended claims. It will be recognized by those skilled in the art that changes or modifications may be made to the above described embodiment without departing from the broad inventive concepts of the subject disclosure. It is understood therefore that the subject disclosure is not limited to the particular embodiment which is described, but is intended to cover all modifications and changes within the scope and spirit of the subject disclosure.

What is claimed is:

1. A protective cover comprising:
a frame having an elastic edge, the elastic edge adapted to fit over a car seat;
a first layer of material within the frame;
a second layer of material within the frame and substantially overlapped by the first layer of material; and
a canopy positioned on the frame, wherein the canopy is adapted to cover a portion of the second layer that is not coverable by the first layer;
wherein the first layer of material is rollable over the second layer of material.

2. The protective cover of claim 1, wherein the canopy is retractable.

3. The protective cover of claim 1, wherein the canopy is extendable over part of the second layer of material.

4. The protective cover of claim 3, further comprising a strap to maintain the canopy in a given position.

5. The protective cover of claim 3, further comprising rigid inserts in the canopy to maintain the canopy in a given direction away from an infant's face when placed in the car seat.

6. The protective cover of claim 1, wherein the first layer of material is shorter than the second layer of material, and exposes a portion of the second layer of material.

7. The protective cover of claim 5, wherein the exposed portion of the second layer of material is coverable by an extendable canopy.

8. The protective cover of claim 1, wherein the second layer of material is rollable.

9. The protective cover of claim 1, further comprising a pocket to accommodate the first layer when it is completely rolled.

10. The protective cover of claim 1, wherein the first layer of material is insulated.

11. The protective cover of claim 10, wherein the second layer of material comprises a breathable material.

12. The protective cover of claim 11, wherein the second layer of material comprises a mesh.

13. The protective cover of claim 12, wherein a mesh window is formed by the second layer of material and a fully extended first layer of material.

14. The protective cover of claim 1, further comprising a rigid insert in a portion of the frame to maintain structural integrity.

15. The protective cover of claim 14, wherein the rigid insert is positioned near a face area of an infant placed in the car seat.

16. A protective cover for a car seat, comprising:
a frame having an elastic edge, the elastic edge adapted to stretch over a car seat;
a first layer of insulating material within the frame;

a second layer of mesh material within the frame and larger in size than the first layer of material, wherein when the first layer of material is fully extended to cover the second layer of material, an exposed portion of the second layer of material remains uncovered;

an extendable canopy that covers the exposed portion of the second layer of material;

a storage compartment; and wherein the first layer of material is rollable into the storage compartment.

17. The protective cover of claim 16, further comprising a rigid insert in a portion of the frame to maintain structural integrity.

18. A protective cover for a car seat, comprising:

a frame having an elastic edge, the elastic edge adapted to stretch over a car seat;

a first layer of insulating material within the frame;

a second layer of mesh material within the frame and larger size than the first layer of material, wherein when the first layer of material is fully extended to cover the second layer of material, an exposed portion of the second layer of material remains uncovered; and an extendable canopy positioned on the frame that covers the exposed portion of the second layer of material.

\* \* \* \* \*